UNITED STATES PATENT OFFICE.

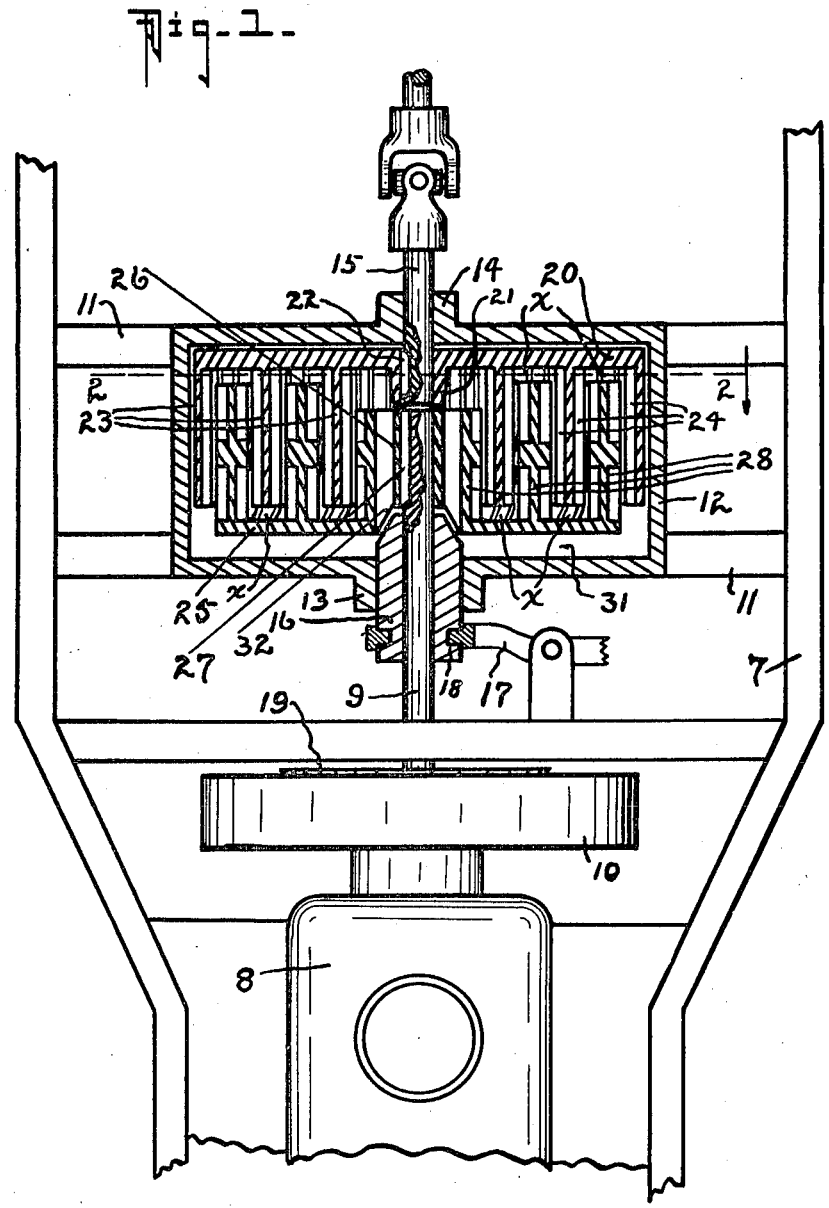

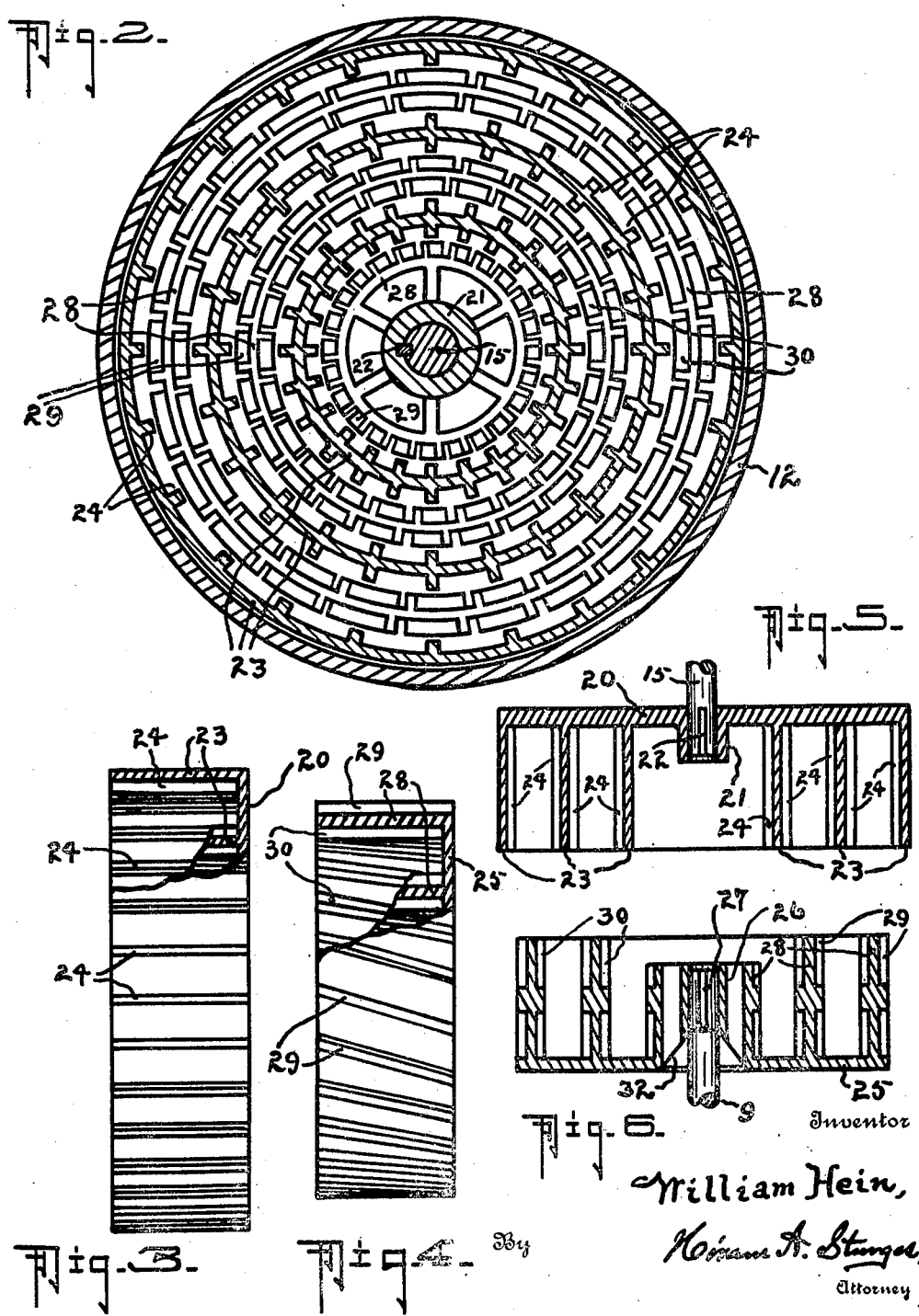

WILLIAM HEIN, OF ANSLEY, NEBRASKA.

TRANSMISSION MECHANISM.

1,291,871.  Specification of Letters Patent.  Patented Jan. 21, 1919.

Application filed June 17, 1918. Serial No. 240,536.

*To all whom it may concern:*

Be it known that I, WILLIAM HEIN, a citizen of the United States, residing at Ansley, in the county of Custer and State of Nebraska, have invented certain new and useful Improvements in Transmission Mechanism, of which the following is a specification.

This invention relates to a transmission mechanism particularly adapted for use in connection with internal combustion engines, and has for its object to provide such a construction that a changeable speed may be provided for the propeller shaft by the engine shaft without the use of toothed gears, friction gears, or magnetic attraction, to consist of few parts, and which will be durable and convenient in use and effective for changing the speed.

The invention broadly includes a means for rotating an auxiliary or propeller shaft by centrifugal force applied by a main or drive shaft, the medium being oil or other liquid confined in a receptacle, the respective shafts being provided with circular blades disposed in interposed relation, whereby the liquid, by said centrifugal force, will be circulated in a manner to cause said rotation, means being provided to control the circulation of the liquid to thereby provide a corresponding degree of speed.

With the foregoing objects in view, the invention presents a novel construction, combination and arrangement of parts, as described herein and claimed, and as illustrated in the accompanying drawing, wherein—

Figure 1 is a view showing a part of an automobile frame in plan, the transmission mechanism being shown in longitudinal section. Fig. 2 is a transverse section through the mechanism on line 2—2 of Fig. 1, the scale being enlarged. Fig. 3 is a partly broken away side view of a blade-bearing disk for the propeller shaft. Fig. 4 is a similar view of a blade-bearing disk for the drive shaft. Figs. 5 and 6 are views in detail relating to Fig. 2 to clearly show the two blade-bearing disks employed.

Referring now to the drawing for a more particular description, numeral 7 indicates an automobile frame; and an engine, and an engine shaft are respectively indicated at 8 and 9, and a balance wheel, carried by said shaft, is indicated at 10.

Numeral 11 indicates a suitable transmission frame with which the vehicle frame is provided, and secured thereon by any suitable means is a cylindrical receptacle 12 provided, in line with its longitudinal axis, with suitable bosses, these projecting outwardly from its front and rear ends and indicated, respectively, at 13 and 14.

Mounted in suitable bearings, including the boss 14, is the propeller shaft 15; and having bearings in the boss 13 and circumscribing the shaft 9, is a valve 16 preferably of cone-shape, said valve being adapted to have a slidable movement on the shaft 9 by means of a rock-lever 17 engaging in the annular groove 18 of said valve. Numeral 19 indicates a clutch which is mounted on the shaft 9 for engagement with or to be disengaged from the balance wheel.

Disposed within the receptacle 12 is a disk 20, said disk being provided at its axis with a hub 21, and by means of a key 22 said disk is secured to the shaft 15. This disk is also provided at one of its ends with a plurality of circular blades 23 at different distances from its axis, said blades preferably being provided with ridges or ribs 24.

Disposed within the receptacle 12, opposite to the disk 20 is a second disk 25 provided with a sleeve 26 disposed at its longitudinal axis, and by means of a key 27 said last named disk is secured to the shaft 9. This disk is also provided at one of its ends and at different distances from its longitudinal axis with a plurality of circular blades 28 each preferably being provided with ridges or ribs on its outer and inner sides as indicated respectively at 29 and 30, these ribs being formed inclinedly with reference to the axis of said disk, the degree of the inclination of the ribs 29 and 30 being substantially the same, but in directions opposed to each other.

While the ribs mentioned are preferred for the blades, I do not wish to limit myself to their use, since the blades may have smooth surfaces, and the mechanism will be operative in all instances for transmitting rotation to the propeller shaft.

As above described, the circular blades of the two disks are disposed adjacent to each other in interposed relation. The remaining space within the receptacle 12 is filled with a suitable liquid, oil being preferred. Numeral 31 indicates a suitable passageway between the disk 25 and the adjacent end of the cylindrical receptacle 12 for a movement of the oil.

It will be understood that when the shaft 9 is rotated the disk 25 will also be rotated, and if the valve 16 is removed from its seat 32, the oil will move between the blades toward the outermost blades of the disks by centrifugal force, and while moving will cause the circular blades of the disk 20 to move circularly in the same direction as the blades of said disk 25, the shaft 15 thereby being rotated, the oil entering or passing inwardly of the valve seat.

It will be noted by referring to Fig. 1 that the ends of the circular blades of one disk are disposed adjacent to the other disk to provide passageways $x$ for a movement of the oil, said oil moving between the blades 23 and 28 from the valve seat 32 toward the circular blades of greatest diameter, and returning through the passageway 31 to said valve seat. If a greater speed is desired, the operator by use of the lever 17, causes the valve to slide outwardly.

By use of the construction as described, an operator may change the speed of the propeller shaft, as may be required. The mechanism will be durable since the metallic parts are not in contact while moving, and operation to effect the variable speed will be convenient.

The cylindrical receptacle 12 and disks may have such diameter as may be suitable and the circular blades may have such length as may be found to be of advantage. Also the space between the circular blades may be changed as well as small details of construction, and I do not wish to limit myself in these respects, nor to size or proportion of parts or material to be employed, since the scope of the invention is determined by the appended claims.

What I claim as my invention and desire to secure by Letters Patent is,—

1. In transmission mechanism, a cylindrical receptacle for containing a fluid, a disk, a second disk provided at its axis with a valve seat, each disk being provided at one of its ends with a plurality of circular blades having transverse ridges, said disks being disposed opposite to each other within the receptacle with their blades disposed in interposed relation, the free ends of the blades of each disk being disposed adjacent to the opposite disk, a valve for the valve seat, means for opening and closing the valve, a propeller shaft mounted on the first named disk, a driven shaft for rotating the second disk to cause a rotation of the first named disk for rotating the propeller shaft by operation of the fluid while moving by centrifugal force outwardly between the blades of said disks.

2. In transmission mechanism, a stationary, cylindrical receptacle for containing oil, a disk, a second disk provided with a valve seat, each disk being provided at varying distances from its axis projecting transversely from one of its ends with endless blades having transverse ridges, said disks being disposed within the receptacle with their blades interposed, the free ends of the blades of one disk being disposed adjacent to the other disk to provide passageways therebetween, a valve for said valve seat, means for operating the valve, an auxiliary shaft mounted on the first named disk, and a driven shaft for rotating the second disk to cause a rotation of the first named disk for actuating the auxiliary shaft by operation of the oil while moving outwardly in said passageways by centrifugal force.

In testimony whereof, I have affixed my signature in presence of two witnesses.

WILLIAM HEIN.

Witnesses:
C. MACKEY,
E. O. MORRIS.